United States Patent [19]

Shapiro

[11] Patent Number: 5,420,907
[45] Date of Patent: May 30, 1995

[54] AUTOMATIC CONTROL SYSTEM FOR A REMOTELY CONTROLLABLE SOUND PRODUCING DEVICE

[76] Inventor: L. Dennis Shapiro, 24 Essex Rd., Chestnut Hill, Mass. 02167

[21] Appl. No.: 97,850

[22] Filed: Jul. 27, 1993

[51] Int. Cl.$^6$ .......................................... H04M 11/04
[52] U.S. Cl. ..................... 379/38; 379/102; 379/110
[58] Field of Search .............. 379/102, 104, 105, 90, 379/38–40, 45, 47, 49, 51, 110; 348/734; 381/55–57, 104, 107, 108, 110, 72

[56] References Cited

U.S. PATENT DOCUMENTS

| | | | |
|---|---|---|---|
| 3,446,976 | 5/1969 | Shaw | 250/217 |
| 3,532,823 | 10/1969 | Ellis | 179/2 |
| 3,806,663 | 4/1974 | Peek et al. | 179/41 A |
| 3,939,311 | 2/1976 | Smith | 179/81 R |
| 3,940,701 | 2/1976 | Novitski | 325/392 |
| 4,243,973 | 1/1981 | Sandidge | 379/102 |
| 4,438,527 | 3/1984 | Hammond | 381/107 |
| 4,760,593 | 7/1988 | Shapiro et al. | 379/38 |
| 4,819,263 | 4/1989 | Franklin | 379/390 |
| 4,858,033 | 8/1989 | Chippendale | 360/14.2 |
| 4,873,712 | 10/1989 | Porco | 379/58 |
| 4,959,851 | 9/1990 | Tobolski, Jr. et al. | 379/59 |
| 5,028,919 | 7/1991 | Hidaka | 348/734 |
| 5,128,987 | 7/1992 | McDonough et al. | 379/102 |
| 5,164,729 | 11/1992 | Decker et al. | 342/20 |
| 5,233,646 | 8/1993 | Kuromi | 379/102 |
| 5,251,253 | 10/1993 | Chutuk | 379/102 |
| 5,265,154 | 11/1993 | Schotz | 379/102 |

FOREIGN PATENT DOCUMENTS 55-135407 10/1980 Japan .................... 379/102

Primary Examiner—Wing F. Chan
Attorney, Agent, or Firm—Weingarten, Schurgin, Gagnebin & Hayes

[57] ABSTRACT

Electronic circuitry is provided that is operative to detect telephone usage or doorbell activation, whereupon the circuitry causes a command signal, such as a muting signal recognizable by an audio or sound producing device, to be emitted and deactivate or mute the device. With respect to muting in response to a phone call, a manual operator input or detection of a telephone on-hook condition causes the device to be restored. Following doorbell activation induced muting, timing features of the circuitry cause a restoration signal to be sent to the device automatically after a predetermined period of time has elapsed. The muting circuitry is particularly suited as an enhancement to a personal emergency response system, as well as for a remotely monitored alarm system that incorporates a listening device. The system including the muting circuitry can function as a stand-alone system or be tied into an automated building data bus.

20 Claims, 3 Drawing Sheets

AUTOMATIC CONTROL SYSTEM FOR A REMOTELY CONTROLLABLE SOUND PRODUCING DEVICE

FIELD OF THE INVENTION

This invention relates to personal emergency response systems and to muting circuitry useful therewith.

BACKGROUND OF THE INVENTION

Personal emergency response systems are known in which a subscriber can signal an emergency condition by depressing a control button to cause automatic dialing and signaling of a response center which will act to summon help to the subscriber. Such systems often have a speaker-phone at the subscriber station so that communication with the subscriber can be attempted or carried out after an emergency call has been made and the call established. The use of such speaker-phone communication during an emergency call can be seriously impaired if a television, radio or other audio device is operating in the same room as the speaker-phone or in the same facility at a volume sufficient to interfere with the conversation attempted via the speaker-phone. The problem is exacerbated if the subscriber is an aged or other individual having impaired hearing ability.

It would, therefore, be desirable to provide speaker-phone operation in a personal emergency response system, as well as in other similar contexts, where the presence of operating television sets, radios and the like would not interfere with telephone use.

SUMMARY OF THE INVENTION

In brief, the invention provides a system for automatically providing a command signal to a television, radio, or other audio-producing device in response to a telephone call or other designated event. The command signal is associated with any of a number of operator selectable functions. One such function is device muting or deactivation so that otherwise audible sounds from the television or other device will not interfere with a telephone conversation or other intended activity. Another function is channel changing to a predetermined station or frequency, such as a communications link or an emergency information network, for example.

The invention has particular application in a personal emergency response system. For this aspect of the invention, a muting signal can be provided directly in response to actuation of a control button used by a subscriber to automatically dial and signal an emergency response center or to initiate a predetermined calling sequence. In another aspect of the invention, circuitry is provided that is operative to detect an incoming telephone call or an off-hook condition. Upon such detection, a muting signal is transmitted to a television set, a radio, an audio system, or other audio-producing device.

The invention is not limited to operation within a personal emergency response system, but can also be employed to mute a television set or other audio device in response to an incoming call on an ordinary telephone, thereby providing an environment conducive to telephonic communication without the distraction or interference of sounds of audio equipment present in the vicinity of the telephone.

According to another aspect of the invention, a muting signal can be provided in response to an event or condition other than an incoming telephone call. For example, the invention can be operative in response to the ringing of a doorbell, either by detection of the ringing sound or signal or by detection of the switch closure of the doorbell button. The muting signal is provided in response to such detection to cause muting of one or more associated audio devices.

According to yet another aspect of the invention, a muting signal can be provided by remote activation of a listening device associated with an alarm system. The ensuing muting of one or more audio-producing devices at the alarmed location allows an operator at a remote monitoring station to "listen in" on activity at the alarmed location that might be otherwise undetectable due to noise produced by the audio producing device.

The circuitry also provides for restoration of a muted audio producing device to its pre-muted audio producing state. With respect to muting in response to a phone call, a manual operator input or detection of a telephone "on-hook" condition causes the device to be restored. Following doorbell activation induced muting, timing features of the circuitry cause a restoration signal to be sent to the device automatically after a predetermined period of time has elapsed. Similarly, in association with an alarm system, deactivation of the listening device is an event which is detected and employed to restore the audio device to its activation state.

In a preferred embodiment, the muting signal is provided in a form recognizable by a television set or other audio-producing device having built-in muting capability and transmitted via a wireless link such as via infrared communication. If an audio device without built-in muting capability is to be controlled, the invention contemplates the provision of a controller which is connectable to the device to cause muting of the audio, or the provision of a shut-off signal to completely deactivate the device in response to the muting signal. Upon receipt of another signal from the muting system, the controller restores the device.

BRIEF DESCRIPTION OF THE DRAWINGS

These and further features of the invention may be better understood with reference to the accompanying specification and the drawings in which.

DETAILED DESCRIPTION OF THE INVENTION

Figure 1:
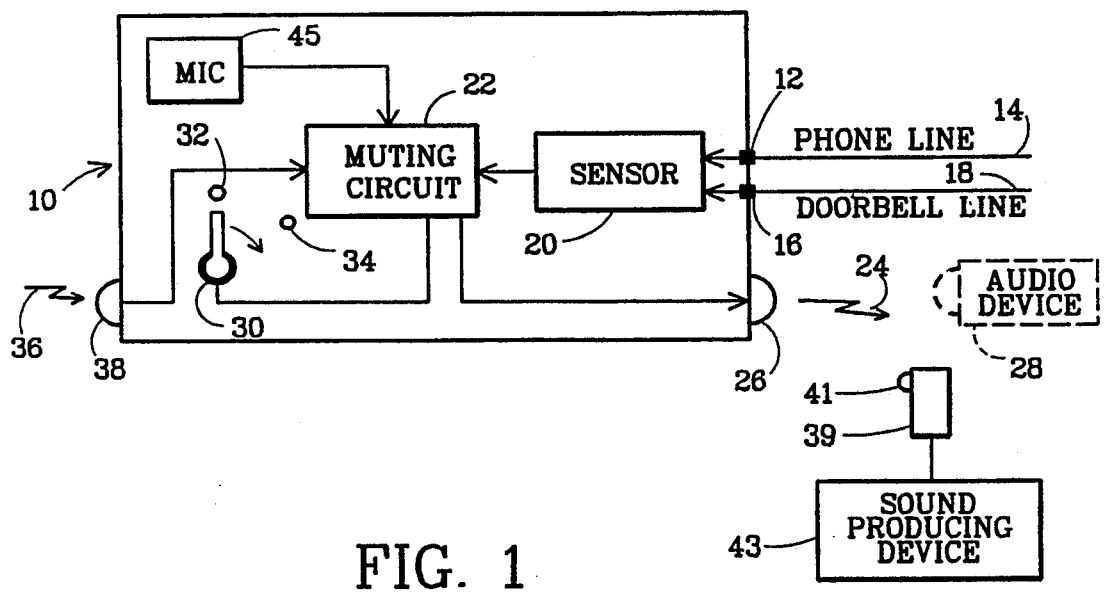
FIG. 1 is a schematic illustration of an automatic muting system in accordance with the invention.

FIG. 1 is a schematic illustration of an automatic muting system 10, having at least one input line connector 12 connecting a signal transmission line 14, such as a telephone line, to the automatic muting system 10. The word "transmission line" comprises wired lines or paths such as electrical wire paths and optical fiber paths, as well as wireless paths such as radio, microwave, laser, electronic and the like. Also depicted is an optional second input line connector 16 connecting a second signal transmission line 18, such as a doorbell line, to the automatic muting system 10. The automatic muting system 10 includes a sensing circuit or sensor 20 in communication with the input line connectors 12, 16 that detects a predetermined signal input from the signal transmission lines 14, 18 and produces a sensor output.

Figure 2:
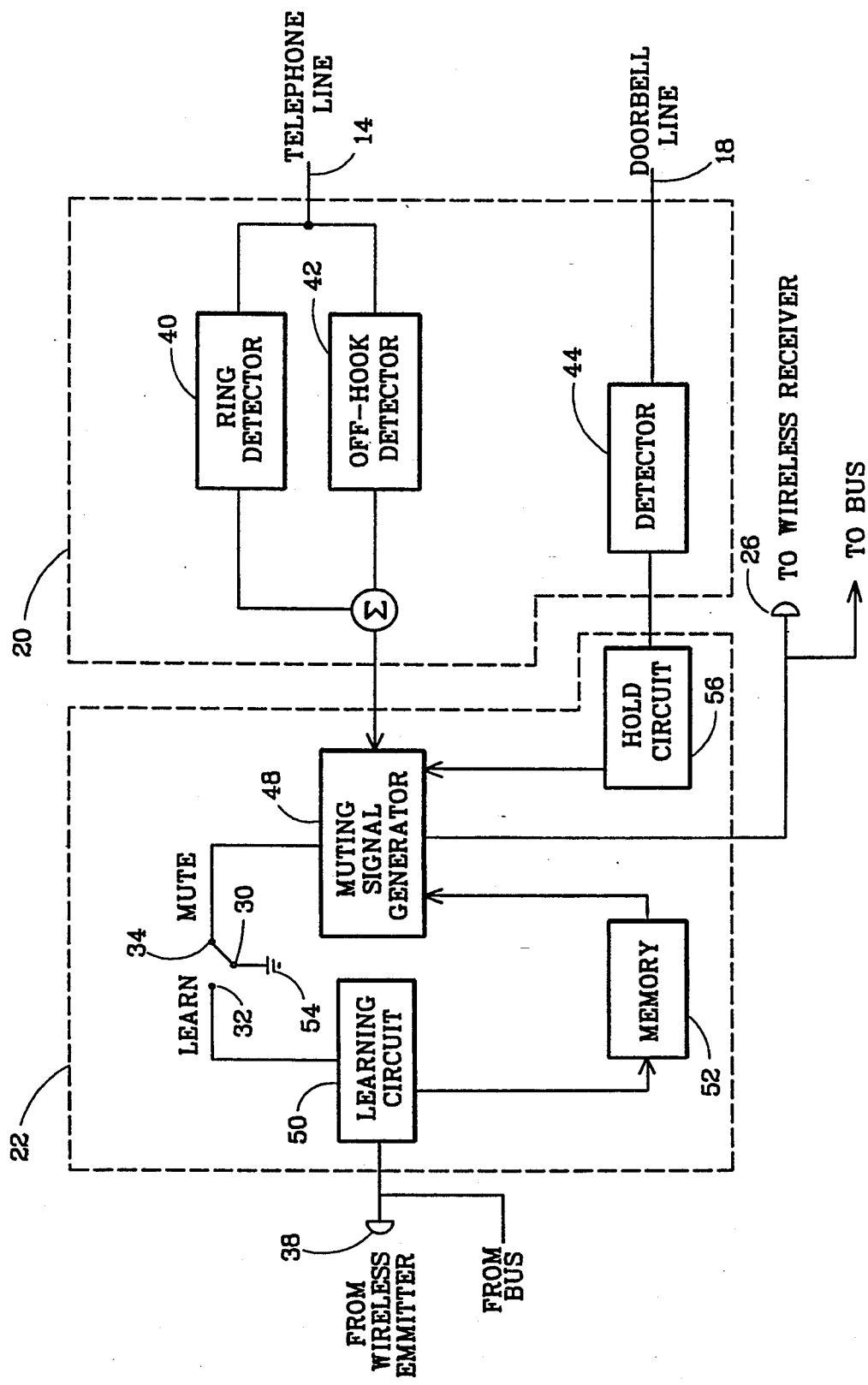
FIG. 2 is a block diagram of the automatic muting system of FIG. 1.

The automatic muting system 10 further includes a command signal circuit, such as a muting circuit 22, discussed in greater detail with respect to FIG. 2, that processes the sensor output to generate a command signal, such as a muting signal 24. The command signal circuit is responsive to an operator's selection of a desired function, and although the description hereinbelow is directed toward embodiments of the invention for muting, the invention is equally suitable for turning equipment on and off, as well as for selecting a predetermined station or communications link, for example.

With respect the command circuit that includes a muting circuit, a wireless emitter 26, such as an infrared or radio frequency device is provided to transmit the muting signal 24 to a remotely controllable, sound or audio-producing device 28, such as a television, stereo, or any other audio-producing apparatus that is responsive to an emitted signal or that is remotely controllable. It is to be understood that the muting circuit 22 also is able to restore or "un-mute" a device 28 muted thereby by generating a restoration signal. When the circuit is used to automatically select a predetermined frequency, the restoration signal can cause a selected device 28 to return to the previous channel or frequency.

However, not all remotely controllable, audio-producing devices 12 are responsive to a common muting signal. Therefore, the muting circuit 22 of the remote muting system 10 is provided with optional circuitry for "learning" the code required for a specific audio-producing device 28 to be controlled. Accordingly, a switch 30 is provided that is movable, as indicated by the arrow, between a learn position 32 and a normal operating, or muting, position 34. When the automatic muting system 10 incorporates learning circuitry, the learning circuitry is responsive to an emitted signal 36 from, for example, the audio device's normal remote control unit, that is captured by a suitable receiver 38.

The invention is also useful with audio devices that do not have mute buttons or which do not have remote control muting features. Therefore, an additional feature of the invention is a muting controller 39, shown in FIG. 1. The muting controller 39 is provided with a wireless receiver 41 to intercept the muting signal 24 emitted from the automatic muting system 10 and is responsive thereto for muting, turning off, or otherwise controlling a sound producing device 43. Alternatively, the muting controller 39 can be responsive to the automatic muting system 10 through the normal electrical wiring of a building to which both are coupled.

In one embodiment, the sound producing device 43 is plugged into the muting controller 39 which is plugged into a wall socket. When the muting controller receives a muting signal, it shuts off power to the device 43 to silence it until a restoration signal is received, or for a predetermined period of time, after which the device 43 is restored.

Because some control signals to mute and restore, or turn on and off are identical, under some circumstances the initial detection of an event by the sensor 20 could turn on or restore a presently muted device 28, thus confounding the intended benefit of the invention. Accordingly, the automatic muting system 10 can be provided with a microphone 45 that listens to the ambient conditions for sounds associated with an audio device 28. The ringing sound of the phone or buzz of the doorbell, for example, if associated with an event signal, is filtered out using techniques known to those skilled in the art. The microphone 45 can be placed in communication with the muting circuit 22 via appropriate logic so that detection of audio device sounds causes the microphone 45 to provide an enabling signal to the muting circuit 22. If no sound is detected, the muting circuit 22 is not enabled.

FIG. 2 is a more detailed block diagram of one embodiment of the sensor 20 and muting circuit 22 of the automatic muting system 10. The sensor 20 is provided with one or more detectors to detect a predetermined event identified with a signal input from the signal transmission lines 14, 18. In an exemplary embodiment, a ring detector 40 senses an incoming telephone call. An "off-hook" detector 42 is provided for physically or electronically sensing lifting of a handset, or activation of a telephone to respond to or to initiate a call, depending on the type of communication instrument used. A doorbell activation detector 44 is also provided.

Figure 3:
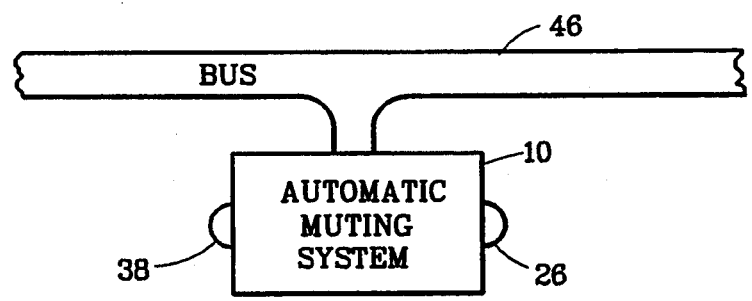
FIG. 3 is a schematic illustration of the automatic muting system of FIG. 1 tied into a signal bus.

The automatic muting system 10 can be provided with additional input line connectors and detectors as desired to accommodate other signal inputs, such as alarms for example, or connected to a data bus 46 such as in an automated building facility as illustrated in FIG. 3. The bus 46 can comprise unidirectional and bi-directional analog and digital signal transmission paths for communication devices, alarms, appliances, and the like. When connected to a bus 46, the muting signal 24 can be transmitted via the wireless emitter 26 as described with respect to FIG. 1, or directly onto the bus 46.

Referring again to FIG. 2, the muting circuit 22 is shown having a muting signal generator 48 that provides the muting (and restoration) signal 24, a learning circuit 50, and a memory unit 52. When the switch 30 is moved to the learn position 32, a power source 54, such as a battery, energizes the learning circuit 50. The emitted signal 36 is received by the wireless receiver 38 or the bus 46 and is analyzed to determine the code needed to make the audio device 28 responsive to the muting signal 24. Having been analyzed, the code is stored in the memory unit 52 for further processing by the muting signal generator 48.

When the switch 30 is moved to the mute position 34, the muting signal generator 48 and sensor 20 are energized, the muting signal 24 based upon the code is established, and the muting signal generator 48 enters a waiting state. Upon receipt of a predetermined event signal from the sensor 20, the muting signal generator 48 outputs the muting signal 24 to the emitter 26 or bus 46. When the predetermined event signal is absent or another event trigger signal is present, the muting signal generator 48 generates a restoration signal for transmission to the audio device 28. A hold circuit 56 or timer can be provided to establish a preprogrammed muting interval, such as 15 seconds, in association with the doorbell detector 44, for example. Manual restoration by the operator is also possible.

Figure 4:
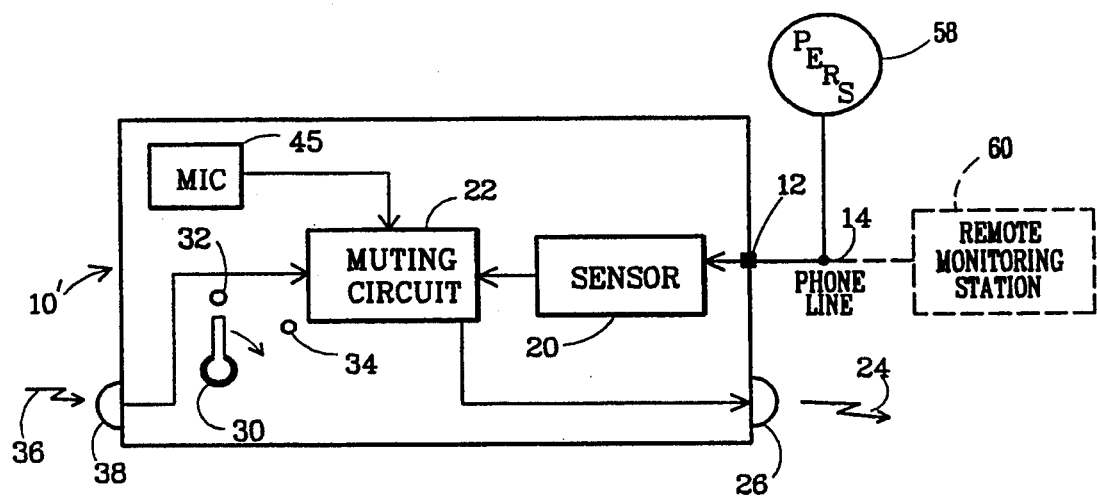
FIG. 4 is a schematic illustration of an embodiment of the automatic muting system of FIG. 1, configured for a personal emergency response system.

FIG. 4 is a schematic illustration of an automatic muting system 10' that enhances the utility of a personal emergency response system (PERS) 58. Muting of audio-producing devices is especially important for the typical user of a personal emergency response system for several reasons. Not infrequently, such users are hearing impaired, and thus are unable to distinguish the ringing of a telephone or doorbell over or through the din of one or more audio devices. Additionally, some personal emergency response systems include a speaker-phone through which a rescuer at a remote monitoring station 60, for example, can interactively communicate with the subscriber. For this feature to be effective, relatively quiet ambient conditions must prevail to enable the rescuer to hear weak or garbled utterances of a subscriber in distress. Accordingly, when an activation mechanism for the personal emergency response system 58 is triggered to engage the telephone line 14, the sensor 20 detects this in the manner described with respect to FIGS. 1 and 2, and a muting signal 24 is sent to the audio device 28. When the personal emergency response system 58 disengages from the signal transmission line 14, a restoration signal is emitted to return the audio to its previous level.

In addition to incorporation in personal emergency response system applications, other communications applications, such as remotely monitored alarm systems benefit from the advantages of remote muting provided by the circuitry of the invention. A "listen-in alarm" system, for example, uses listening devices such as microphones to continuously listen to sounds at the subscriber's premises, such as those sounds associated with breaking and entering, like loud blows or breaking glass. Appropriate filters and logic determine when an "alarm" condition is achieved and the remote monitoring station is signaled to obtain an appropriate response.

Figure 5:
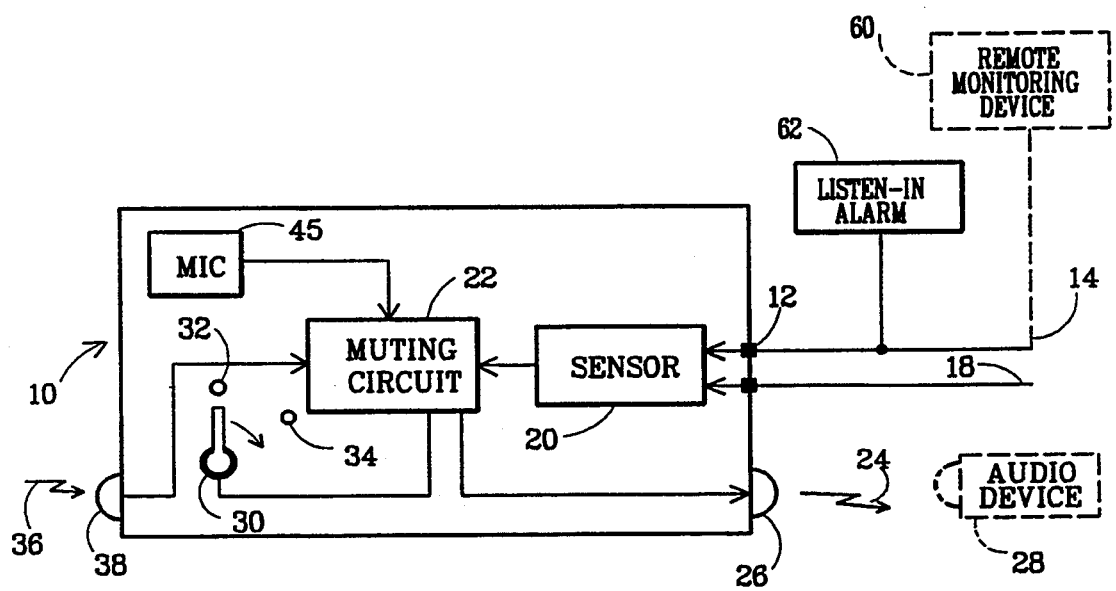
FIG. 5 is a schematic illustration of the automatic muting system of FIG. 1, configured for a listening device associated with a remote monitoring system.

Referring to FIG. 5, an automatic muting system 10 is illustrated in communication with a remote monitoring station 60 and a listen-in alarm 62. In this application, the activation of the alarm 62, by the triggering of the alarm at the protected site or by actuation by the monitoring station and a concomitant call to the remote monitoring station 60 are events detectable by the sensor 20 in the automatic muting system 10 which then initiates the muting sequence as described hereinabove for muting one or more audio-producing devices 28. The muting signal can be provided in response to any one or more detectable events in a particular embodiment. It is to be understood that an audio-producing device 28 can include anything that produces audible sounds to include machinery, a fan, a blower, and the like. After a predetermined time interval or discontinuance of the "alarm" condition, a restoration signal is emitted to restore the muted devices 28 to their previous state.

Although the invention has been shown and described with respect to exemplary embodiments thereof, various other changes omissions and additions in form and detail thereof may be made therein without departing from the spirit and scope of the invention.

What is claimed is:

1. For use in a personal emergency response system having a subscriber unit operative to dial and communicate with an emergency response center, a system for muting an audio device in the vicinity of the subscriber unit, said system comprising:
    a first circuit operative in response to detection of an incoming call to provide a first signal indicative of call detection;
    a second circuit operative in response to the first signal for providing a coded muting signal having a form recognizable by said audio device;
    a transmitter coupled to said second circuit and operative to convey said coded muting signal to said audio device to cause muting thereof; and
    a microphone in communication with said second circuit, wherein detection of an audio output from said audio device above a predetermined threshold by said microphone causes said second circuit to be enabled.

2. An automatic muting system for muting a remotely controllable audio-producing device, comprising:
    a connector for connecting said automatic muting system to a telephone line, a doorbell line, and a personal emergency response system;
    a sensor in communication with said connector, said sensor detecting activation of a telephone in response to incoming and outgoing calls, lifting of a telephone handset, activation of a doorbell, and activation of said personal emergency response system to produce a sensor output;
    a receiver for capturing an encoded, emitted control signal for said remotely controllable audio-producing device;
    a learning circuit for analyzing said encoded, emitted control signal;
    a memory unit for storing said analyzed control signal for access by said muting signal generator;
    a muting signal generator that processes said analyzed control signal to generate a muting signal and an un-muting signal recognizable by said remotely controllable audio-producing device;
    an emitter for conveying said muting signal and said un-muting signal from said muting signal generator to said remotely controllable audio-producing device which is muted and restored, respectively, thereby;
    a hold circuit responsive to said sensor output and an operator selectable input for establishing a predetermined interval between muting and restoration of said audio-producing device; and
    a microphone in communication with said muting signal generator, wherein detection of an audio output from said audio-producing device above a predetermined threshold by said microphone causes said muting signal generator to be enabled.

3. The automatic muting system of claim 2, further comprising a muting controller having a wireless receiver, said muting controller adapted to interrupt a power supply to said audio device, thereby muting it, upon receipt of said muting signal.

4. An automatic control system for a remotely controllable sound-producing device, comprising:
    a sensor operative to detect a predetermined input signal and to produce a sensor output signal;
    a control circuit responsive to said sensor output signal to produce a control signal recognizable by said remotely controllable device, wherein said control circuit is a muting circuit and said control signal is a muting signal, said muting circuit also capable of producing a restoration signal recognizable by said remotely controllable device that causes the restoration thereof to a pre-muting condition;
    an emitter for conveying said control signal from said automatic control system to said remotely controllable device to control said remotely controllable device thereby; and
    a microphone in communication with said muting circuit, wherein detection of an audio output from said remotely controllable device above a predetermined threshold by said microphone causes said muting circuit to be enabled.

5. The automatic control system of claim 4, wherein said sensor is adapted to detect activation of a telephone in response to incoming and outgoing calls.

6. The automatic control system of claim 4, wherein said muting signal mutes said remotely controllable device by interrupting a power supply thereto.

7. The automatic control system of claim 4, wherein said sensor is adapted to detect activation of a doorbell.

8. The automatic control system of claim 4, wherein said sensor is adapted to detect activation of a personal emergency response system.

9. The automatic control system of claim 4, wherein said sensor is adapted to detect signal transmission line activity.

10. The automatic control system of claim 4, wherein said sensor is adapted to detect activation of a listening device associated with an alarm system.

11. The automatic control system of claim 4, wherein said sensor is adapted to detect a telephone off-hook condition.

12. The automatic control system of claim 4, wherein said emitter is a wireless emitter.

13. The automatic control system of claim 12, wherein said wireless emitter produces an infra-red signal.

14. The automatic control system of claim 12, wherein said wireless emitter produces a radio frequency signal.

15. The automatic control system of claim 4, further including:
   a receiver for capturing an encoded, emitted device control signal for said remotely controllable device;
   a learning circuit for analyzing said encoded, emitted device control signal; and
   a control signal generator that processes said analyzed device control signal to generate said control signal.

16. The automatic control system of claim 15, further comprising a memory unit for storing said analyzed device control signal for access by said control signal generator.

17. The automatic control system of claim 16, further comprising a muting controller having a control signal receiver, said muting controller adapted to interrupt a power supply to said remotely controllable device, thereby muting it, upon receipt of said control signal.

18. The automatic control system of claim 17, wherein said muting controller is responsive to said control signal via a wireless control signal path.

19. The automatic control system of claim 17, wherein said muting controller is responsive to said control signal via a wired signal path.

20. The automatic control system of claim 4, further comprising a hold circuit for establishing a predetermined interval between muting and restoring said remotely controllable device.

* * * * *